(12) United States Patent
Jung et al.

(10) Patent No.: US 11,778,078 B2
(45) Date of Patent: *Oct. 3, 2023

(54) ELECTRONIC DEVICE FOR RECEIVING MULTIBAND GNSS SIGNAL

(71) Applicant: Samsung Electronics Co., Ltd., Suwon-si (KR)

(72) Inventors: Hyukjin Jung, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,068

(22) Filed: Mar. 29, 2022

(65) Prior Publication Data

US 2022/0224785 A1 Jul. 14, 2022

Related U.S. Application Data

(63) Continuation of application No. 17/267,223, filed as application No. PCT/KR2019/010005 on Aug. 8, 2019, now Pat. No. 11,303,741.

(30) Foreign Application Priority Data

Aug. 9, 2018 (KR) .................. 10-2018-0092909

(51) Int. Cl.
*H04M 1/02* (2006.01)
*G01S 19/32* (2010.01)
(Continued)

(52) U.S. Cl.
CPC ............. *H04M 1/026* (2013.01); *G01S 19/32* (2013.01); *H04B 1/0053* (2013.01); *H04W 4/029* (2018.02)

(58) Field of Classification Search
CPC .......... G01S 19/14; G01S 19/32; G01S 19/36; H01Q 1/243; H01Q 1/44; H01Q 21/28;
(Continued)

(56) References Cited

U.S. PATENT DOCUMENTS 7,970,372 B2 6/2011 Watanabe
8,217,833 B2 7/2012 Webber et al.
(Continued)

FOREIGN PATENT DOCUMENTS

CN 106252829 A 12/2016
CN 107258034 A 10/2017
(Continued)

OTHER PUBLICATIONS

Extended European Search Report dated Aug. 2, 2021, issued in a counterpart European Application No. 19847943.8-1216/3820125.
(Continued)

*Primary Examiner* — Nguyen T Vo
(74) *Attorney, Agent, or Firm* — Jefferson IP Law, LLP

(57) ABSTRACT

An electronic device according to an embodiment of the disclosure includes a housing that includes a first plate, a second plate facing away from the first plate, and a side member surrounding a space between the first plate and the second plate and including a first conductive region and a second conductive region electrically separated from the first conductive region, a wireless communication circuitry that is disposed within the space, transmits/receives a first signal in a first frequency band ranging from 1.4 GHz to 6 GHz by using the first conductive region, and transmits/receives a second signal in a second frequency band ranging from 0.6 GHz to 1.4 GHz by using the second conductive region, and a GNSS receiver circuitry that is disposed within the space, receives a third signal in a third frequency band ranging from 1559 MHz to 1610 MHz by using the first
(Continued)

conductive region, and receives a fourth signal in a fourth frequency band ranging from 1164 MHz to 1189 MHz by using the second conductive region. Moreover, various embodiment found through the present disclosure are possible.

30 Claims, 14 Drawing Sheets

(51) Int. Cl.
*H04B 1/00* (2006.01)
*H04W 4/029* (2018.01)

(58) Field of Classification Search
CPC .......... H01Q 5/50; H01Q 9/42; H04B 1/0053; H04B 1/0057; H04B 1/3805; H04B 1/3883; H04M 1/026; H04M 1/72457; H04W 4/029
See application file for complete search history.

(56) References Cited

U.S. PATENT DOCUMENTS

| | | | |
|---|---|---|---|
| 8,654,030 | B1 | 2/2014 | Mercer |
| 9,337,539 | B1 | 5/2016 | Ananthanarayanan et al. |
| 9,385,795 | B1 | 7/2016 | Ananthanarayanan et al. |
| 9,484,631 | B1* | 11/2016 | Napoles ................ H01Q 5/378 |
| 9,645,248 | B2 | 5/2017 | Wallace et al. |
| 9,755,684 | B2 | 9/2017 | Yoo et al. |
| 9,935,359 | B2 | 4/2018 | Kim et al. |
| 10,158,163 | B2 | 12/2018 | Gang et al. |
| 10,411,327 | B2 | 9/2019 | Kim et al. |
| 10,651,542 | B2 | 5/2020 | Choi et al. |
| 10,998,622 | B2 | 5/2021 | Sakong et al. |
| 11,075,447 | B2 | 7/2021 | Choi et al. |
| 11,303,741 | B2* | 4/2022 | Jung ................ H04B 1/0057 |
| 2008/0119157 | A1 | 5/2008 | Watanabe |
| 2010/0176991 | A1 | 7/2010 | Webber et al. |
| 2013/0069842 | A1 | 3/2013 | Lee et al. |
| 2013/0172056 | A1* | 7/2013 | Kim ................ H04B 1/1018 |
| | | | 455/571 |
| 2013/0176171 | A1 | 7/2013 | Webber et al. |
| 2014/0292570 | A1 | 10/2014 | Wallace et al. |
| 2016/0245923 | A1 | 8/2016 | Badke |
| 2016/0254588 | A1 | 9/2016 | Kim et al. |
| 2017/0054199 | A1 | 2/2017 | Gang et al. |
| 2017/0142241 | A1* | 5/2017 | Kim ................ H04M 1/0218 |
| 2017/0310344 | A1 | 10/2017 | Lee et al. |
| 2017/0338549 | A1 | 11/2017 | Yoo et al. |
| 2018/0035444 | A1 | 2/2018 | Wu et al. |
| 2018/0069301 | A1 | 3/2018 | Choi et al. |
| 2019/0334225 | A1 | 10/2019 | Lee et al. |
| 2020/0028241 | A1 | 1/2020 | Jung et al. |
| 2020/0274229 | A1 | 8/2020 | Choi et al. |
| 2020/0411969 | A1 | 12/2020 | Wang et al. |
| 2021/0058115 | A1 | 2/2021 | Yu et al. |
| 2021/0257728 | A1 | 8/2021 | Sakong et al. |
| 2021/0328330 | A1 | 10/2021 | Choi et al. |

FOREIGN PATENT DOCUMENTS

| | | |
|---|---|---|
| CN | 107645060 A | 1/2018 |
| CN | 107799885 A | 3/2018 |
| CN | 109792107 A | 5/2019 |
| JP | 2008-128791 A | 6/2008 |
| KR | 10-2013-0031000 A | 3/2013 |
| KR | 10-2016-0105102 A | 9/2016 |
| KR | 10-2017-0022442 A | 3/2017 |
| KR | 10-2017-0098140 A | 8/2017 |
| KR | 10-2017-0120790 A | 11/2017 |
| KR | 10-2018-0013203 A | 2/2018 |
| KR | 10-2018-0027802 A | 3/2018 |
| KR | 10-2018-0031120 A | 3/2018 |
| WO | 2018/021669 A1 | 2/2018 |

OTHER PUBLICATIONS

Rodriguez Santiago et al: "Design of a dual-antenna and dual-band GPS receiver for CubeSats", 2017 IEEE URUCON, IEEE, Oct. 23, 2017, pp. 1-4, XP033265497, DOI: 10.1109/URUCON.2017. 8171862 [retrieved on Dec. 8, 2017].
Chinese Office Action dated Jan. 30, 2022, issued in a counterpart Chinese Application No. 201980052909.2.
Indian Office Action dated Nov. 17, 2022, issued in a counterpart an Indian Application No. 202117009206.
Korean Office Action dated Dec. 26, 2022, issued in a counterpart a Korean Application No. 10-2018-0092909.

* cited by examiner

ELECTRONIC DEVICE FOR RECEIVING MULTIBAND GNSS SIGNAL

CROSS-REFERENCE TO RELATED APPLICATION(S)

This application is a continuation application of prior application Ser. No. 17/267,223, filed on Feb. 9, 2021, which will be issued as U.S. Pat. No. 11,303,741 on Apr. 12, 2022, which is a U.S. National Stage application under 35 U.S.C. § 371 of an International application number PCT/KR2019/010005, filed on Aug. 8, 2019, which is based on and claimed priority of a Korean patent application number 10-2018-0092909, filed on Aug. 9, 2018, in the Korean Intellectual Property Office, the disclosure of which is incorporated by reference herein in its entirety.

TECHNICAL FIELD

Embodiments of the disclosure relate to a technology for receiving GNSS signals in a multi-band.

BACKGROUND ART

A global navigation satellite system (GNSS) that is a system capable of calculating a location of a specific object by using satellites is being widely used in a number of countries including the United States. In the past, the global navigation satellite system had been used mainly for a military purpose. However, nowadays, the global navigation satellite system is opened to civilians. As such, the utilization range of the global navigation satellite system is being gradually spread to information communication, transportation, farming industry, and the like.

An electronic device (e.g., a smartphone) may receive a GNSS signal from a satellite and may provide a location of the electronic device to a user. For example, the electronic device may receive a GPS L1 signal by using an antenna located at an upper right portion thereof (e.g., an upper right portion of a housing) and may provide a location of the electronic device to the user based on the GPS L1 signal.

Meanwhile, while receiving the GNSS signal, the electronic device may transmit/receive a wireless communication signal (e.g., an LTE signal) in a high band by using the antenna located at the upper right portion thereof. For example, the electronic device may transmit a photo to an electronic device of another user by using the antenna located at the upper right portion or may provide the user with various kinds of content on an Internet browser.

DISCLOSURE

Technical Problem

In the case where an electronic device receives GNSS signals in a multi-band, the electronic device may provide more accurate location information to the user. However, it is not easy to receive the GNSS signals in the multi-band due to a structural restriction of the electronic device. For example, in the case of intending to receive a GPS L5 signal by extending the antenna located at the upper right portion, reception performance for a wireless communication signal may decrease. For another example, in the case of connecting the antenna located at the upper right portion with a receiver circuitry for the GPS L1 and GPS L5 signals, reception performance for the GPS L5 signal may decrease.

Embodiments of the disclosure provide an electronic device for solving the above-described problem and problems brought up in this specification.

Technical Solution

An electronic device according to an embodiment of the disclosure may include a housing that includes a first plate, a second plate facing away from the first plate, and a side member surrounding a space between the first plate and the second plate and including a first conductive region and a second conductive region electrically separated from the first conductive region, a wireless communication circuitry that is disposed within the space, transmits/receives a first signal in a first frequency band ranging from 1.4 GHz to 6 GHz by using the first conductive region, and transmits/receives a second signal in a second frequency band ranging from 0.6 GHz to 1.4 GHz by using the second conductive region, and a GNSS receiver circuitry that is disposed within the space, receives a third signal in a third frequency band ranging from 1559 MHz to 1610 MHz by using the first conductive region, and receives a fourth signal in a fourth frequency band ranging from 1164 MHz to 1189 MHz by using the second conductive region.

Also, an electronic device according to an embodiment of the disclosure may include a housing that includes a first plate, a second plate facing away from the first plate, and a side member surrounding a space between the first plate and the second plate and including a first conductive region and a second conductive region electrically separated from the first conductive region, an antenna structure that is disposed within the space and includes a polymeric structure and a conductive pattern formed in the polymeric structure and/or on the polymeric structure, a wireless communication circuitry that is disposed within the space, transmits/receives a first signal in a first frequency band ranging from 1.4 GHz to 6 GHz by using the first conductive region, and transmits/receives a second signal in a second frequency band ranging from 0.6 GHz to 1.4 GHz by using the second conductive region, and a GNSS receiver circuitry that is disposed within the space, receives a third signal in a third frequency band ranging from 1559 MHz to 1610 MHz by using the first conductive region, and receives a fourth signal in a fourth frequency band ranging from 1164 MHz to 1189 MHz by using the second conductive region.

Also, an electronic device according to an embodiment of the disclosure may include a housing that includes a first plate, a second plate facing away from the first plate, and a side member surrounding a space between the first plate and the second plate and including a first conductive region and a second conductive region electrically separated from the first conductive region, a wireless communication circuitry that is disposed within the space, transmits/receives a first signal in a first frequency band ranging from 1.4 GHz to 6 GHz by using the second conductive region, and transmits/receives a second signal in a second frequency band ranging from 0.6 GHz to 1.4 GHz by using the second conductive region, a GNSS receiver circuitry that is disposed within the space, receives a third signal in a third frequency band ranging from 1559 MHz to 1610 MHz by using the second conductive region, and receives a fourth signal in a fourth frequency band ranging from 1164 MHz to 1189 MHz by using the second conductive region, and a wireless communication tuner that is electrically connected with the second conductive region and the wireless communication circuitry and changes a frequency band of at least one of the first signal and the second signal.

Advantageous Effects

According to embodiments of the disclosure, it may be possible to receive GNSS signals in a multi-band. Also, according to embodiments of the disclosure, a mounting space of an electronic device may be utilized more efficiently by receiving a GNSS signal and a wireless communication signal by using a communication antenna.

Besides, a variety of effects directly or indirectly understood through this disclosure may be provided.

MODE FOR INVENTION

Figure 1:
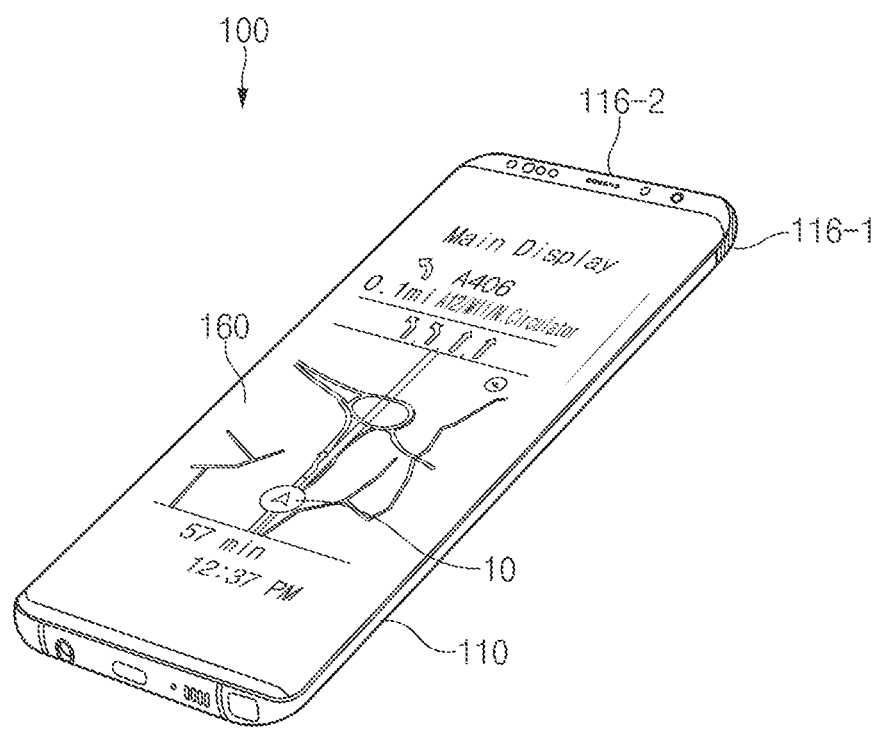
FIG. 1 illustrates an electronic device according to an embodiment.

FIG. 1 illustrates an electronic device according to an embodiment.

Referring to FIG. 1, an electronic device 100 may include a housing 110 and a display 160.

The housing 110 may form the exterior of the electronic device 100. As various kinds of components (e.g., the display 160) are mounted within the housing 110, the housing 110 may protect the various kinds of components from an external impact.

At least a portion of the housing 110 may include a conductive region, and the conductive region may be used as an antenna element. For example, the conductive region may include a first conductive region 116-1 and a second conductive region 116-2. The electronic device 100 may transmit/receive a first signal in a first frequency band ranging from 1.4 GHz to 6 GHz by using the first conductive region 116-1. Also, the electronic device 100 may transmit/receive a third signal in a third frequency band ranging from 1559 MHz to 1610 MHz by using the first conductive region 116-1.

For another example, the electronic device 100 may transmit/receive a second signal in a second frequency band ranging from 0.6 GHz to 1.4 GHz by using the second conductive region 116-2. Also, the electronic device 100 may transmit/receive a fourth signal in a fourth frequency band ranging from 1164 MHz to 1189 MHz by using the second conductive region 116-2. In the specification, the first signal and the second signal may be referred to as a 2G, 3G, or LTE (long term evolution) signal being a wireless communication signal. The third signal and the fourth signals may be global navigation satellite system (GNSS) signals. For example, the third signal and the fourth signals may be referred to as a GSP L1 signal and a GSP L5 signal, respectively.

The display 160 may be disposed within the housing 110. The display 160 may output various kinds of content (e.g., a text, an image, a video, an icon, a widget, a symbol, or the like) or may receive a touch input (e.g., a touch, a gesture, a hovering, or the like) from a user.

According to an embodiment, based on the first signal and the second signal, the electronic device 100 may transmit various kinds of data to another electronic device, or may receive content and may output the received content through the display 160. For example, the electronic device 100 may transmit a message to an electronic device of another user or may receive a message from an electronic device of another user. For another example, the electronic device 100 may output content received through an Internet browser through the display 160.

According to an embodiment, the electronic device 100 may generate location information 10 of the electronic device 100 based on the third signal (e.g., the GPS L1 signal) and the fourth signal (e.g., the GPS L5 signal). When the location information 10 is generated, as illustrated in FIG. 1, the electronic device 100 may output the location information 10 of the electronic device 100 through the display 160, together with a map. An electronic device according to a comparative example may not be easy to receive GNSS signals in a multi-band. As such, the electronic device according to the comparative example may generate location information of the electronic device based on one of the third signal and the fourth signal, and the location information of the electronic device may be inaccurate. However, the electronic device 100 according to an embodiment may receive GNSS signals in a multi-band. Because the electronic device 100 is capable of generating the location information 10 based on the GNSS signals in the multi-band, the electronic device 100 may provide the accurate location information 10 to the user.

Also, the electronic device according to the comparative example may not be easy to receive the GNSS signals in the multi-band and the wireless communication signal at the same time. However, according to an embodiment, the electronic device 100 may receive the GNSS signals in the multi-band and the wireless communication signal at the same time by using the first conductive region 116-1 and the second conductive region 116-2. As such, a mounting space of the electronic device 100 may be utilized more efficiently.

Figure 2:
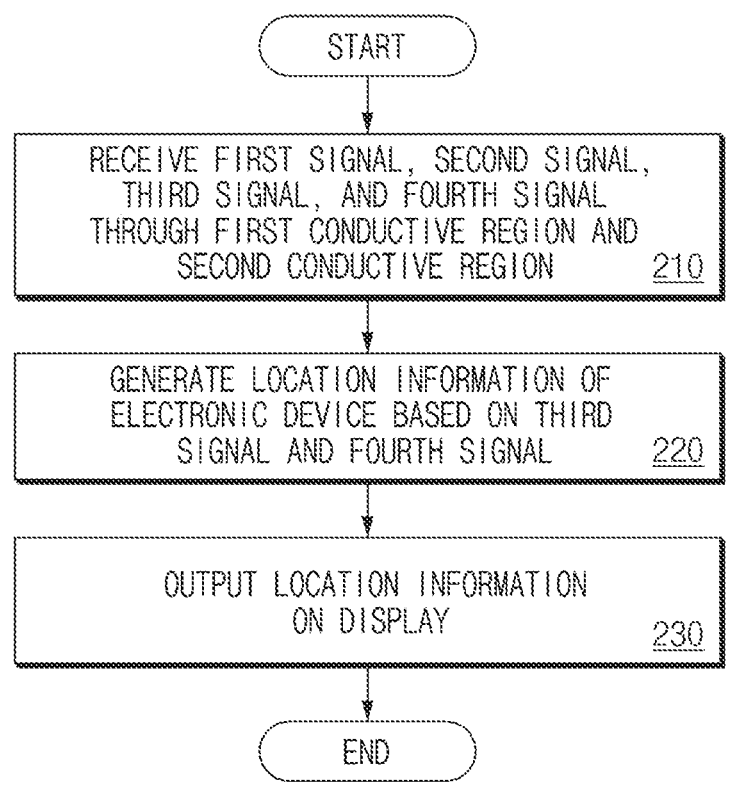
FIG. 2 is an operation flowchart of an electronic device according to an embodiment.

FIG. 2 is an operation flowchart of an electronic device according to an embodiment. FIG. 2 is an operation flowchart of the electronic device 100 illustrated in FIG. 1.

Referring to FIG. 2, in operation 210, through the first conductive region 116-1, the electronic device 100 may transmit/receive the first signal in the first frequency band and may receive the third signal in the third frequency band. Also, through the second conductive region 116-2, the electronic device 100 may transmit/receive the second signal in the second frequency band and may receive the fourth signal in the fourth frequency band.

In operation 220, the electronic device 100 may generate location information of the electronic device 100 based on the third signal and the fourth signal. For example, in the case where the user is within a department store "A", the electronic device 100 may generate location information of the department store "A" based on the third signal and the fourth signal.

Although not illustrated in FIG. 2, the electronic device 100 may transmit/receive various kinds of data to/from another electronic device based on the first signal and the third signal. For example, the electronic device 100 may transmit a message, a photo, a video, and the like to an electronic device of another user or may receive a message, a photo, a video, and the like from an electronic device of another user.

In operation 230, the electronic device 100 may output the location information of the electronic device 100 through the display 160. In the embodiment described in operation 220, the electronic device 100 may output the location information of the department store "A" onto the display 160, together with a map.

Although not illustrated in FIG. 2, the electronic device 100 may output data, which are received based on the first signal and the second signal, through the display 160. For example, the electronic device 100 may output a message, a photo, a video, and the like received from an electronic device of another user through the display 160.

An electronic device according to a comparative example may not be easy to receive GNSS signals in a multi-band. As such, the electronic device according to the comparative example may generate location information of the electronic device based on one of the third signal and the fourth signal, and the location information of the electronic device may be inaccurate. However, the electronic device 100 according to an embodiment may receive the GNSS signals in the multi-band. Because the electronic device 100 is capable of generating location information based on the GNSS signals in the multi-band, the electronic device 100 may provide the accurate location information 10 to the user.

Figure 3:
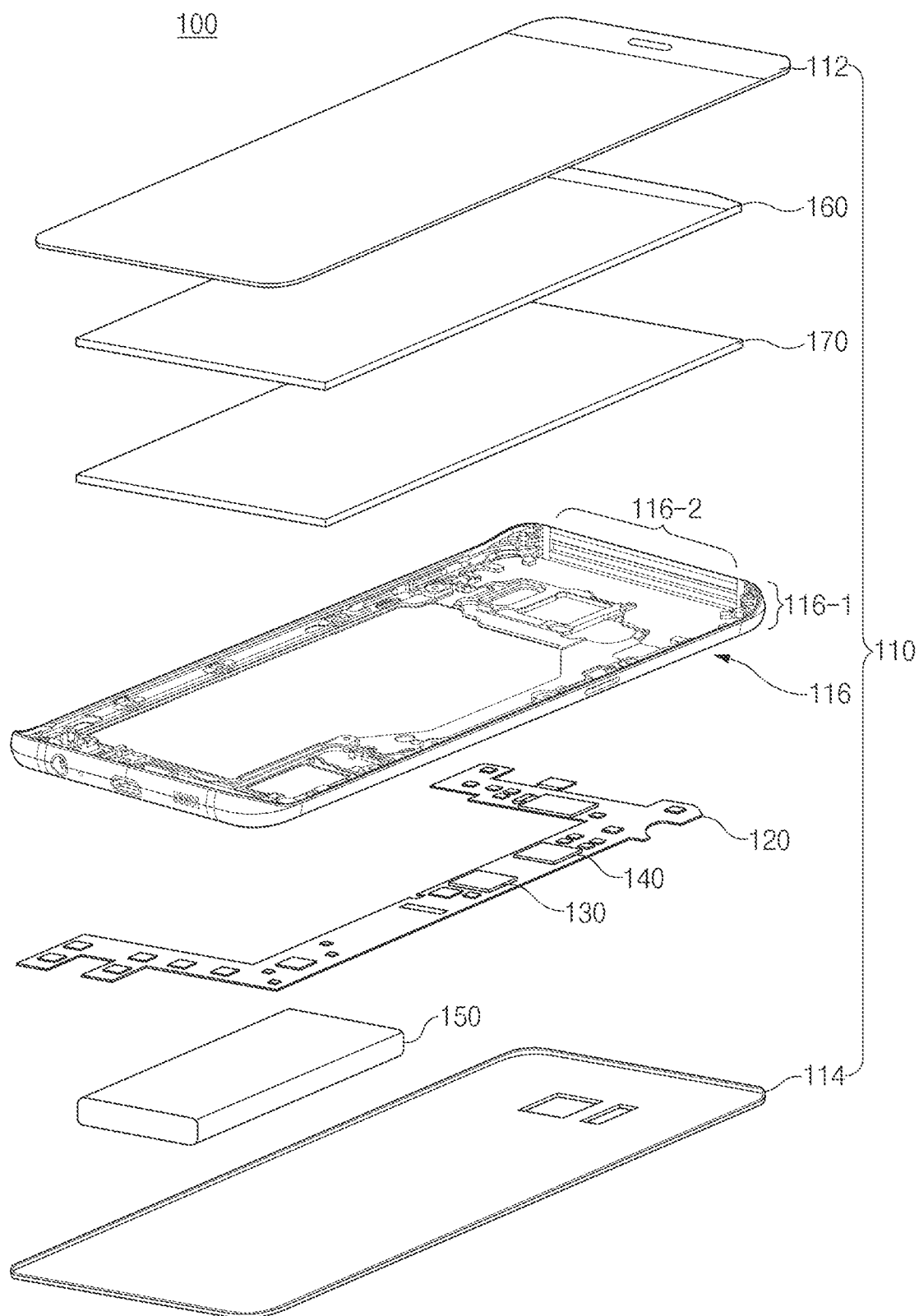
FIG. 3 is an exploded perspective view of an electronic device according to an embodiment.

FIG. 3 is an exploded perspective view of an electronic device according to an embodiment. FIG. 3 is an exploded perspective view of the electronic device 100 illustrated in FIG. 1.

Referring to FIG. 3, the electronic device 100 may include the housing 110, a printed circuit board 120, a wireless communication circuitry 130, a GNSS receiver circuitry 140, a battery 150, the display 160, and a shielding layer 170. According to an embodiment, the electronic device 100 may not include some of the components illustrated in FIG. 3 or may further include any other component not illustrated in FIG. 3. Also, the order in which the components included in the electronic device 100 are stacked may be different from the stacked order illustrated in FIG. 3.

The housing 110 may form the exterior of the electronic device 100. For example, the housing 110 may include a first plate 112, a second plate 114 facing away from the first plate 112, and a side member 116 surrounding a space between the first plate 112 and the second plate 114. In the specification, the first plate 112 and the second plate 114 may be referred to as a cover glass and a back cover, respectively.

The cover glass 112 may transmit a light generated by the display 160. Also, the user may put a portion (e.g., a finger) of his/her body onto the cover glass 112 to perform a touch (including a contact using an electronic pen). For example, the cover glass 112 may be formed of tempered glass, reinforced plastic, a flexible polymer material, or the like. According to an embodiment, the cover glass 112 may be also referred to as a "glass window".

The side member 116 may protect the components included in the electronic device 100. For example, the display 160, the printed circuit board 120, the battery 150, and the like may be accommodated within the side member 116, and the side member 116 may protect the components from an external impact.

According to an embodiment, the side member 116 may be formed of a conductive material and a non-conductive material. A region that is formed of a metal material may be referred to as a metal bezel. According to an embodiment, at least a portion of the metal bezel may be utilized as an antenna element for transmitting/receiving a signal in a specified frequency band.

The back cover 114 may be coupled to a back surface of the electronic device 100 (i.e., below the side member 116). The back cover 114 may be formed of tempered glass, plastic, and/or metal. According to an embodiment, the back cover 114 may be integrally implemented with the side member 116 or may be implemented to be removable by the user.

Various electronic parts, various elements, various printed circuits, or the like of the electronic device 100 may be mounted on the printed circuit board 120. For example, the wireless communication circuitry 130, the GNSS receiver circuitry 140, and the like may be mounted on the printed circuit board 120. In the specification, the printed circuit board 120 may be referred to as a main board or a printed board assembly (PBA).

The wireless communication circuitry 130 may be electrically connected with the first conductive region 116-1 and the second conductive region 116-2. The wireless communication circuitry 130 may transmit/receive the first signal (e.g., a high band signal) in the first frequency band ranging from 1.4 GHz to 6 GHz by using the first conductive region 116-1. Also, the wireless communication circuitry 130 may transmit/receive the second signal (e.g., a low band signal) in the second frequency band ranging from 0.6 GHz to 1.4 GHz by using the second conductive region 116-2. In this specification, the first frequency band may be referred to as a high band, and the second frequency band may be referred to as a low band.

According to an embodiment, the wireless communication circuitry 130 may transmit/receive various kinds of data to/from another electronic device (e.g., a smartphone of another user) based on the first signal and the second signal. For example, the wireless communication circuitry 130 may transmit a message, a photo, a video, and the like to an electronic device of another user or may receive a message, a photo, a video, and the like from an electronic device of another user.

The GNSS receiver circuitry 140 may be electrically connected with the first conductive region 116-1 and the second conductive region 116-2. The GNSS receiver circuitry 140 may receive the third signal (e.g., the GPS L1 signal) in the third frequency band ranging from 1559 MHz to 1610 MHz by using the first conductive region 116-1. Also, the GNSS receiver circuitry 140 may receive the fourth signal (e.g., the GPS L5 signal) in the fourth frequency band ranging from 1164 MHz to 1189 MHz by using the second conductive region 116-2.

According to an embodiment, the GNSS receiver circuitry 140 may output the location information 10 of the electronic device 100 through the display 160 based on the third signal and the fourth signal. For example, in the case where the user executes a navigation app, the GNSS receiver circuitry 140 may output the location information 10 of the electronic device 100 along a movement path of the user, together with a map.

The battery 150 may convert chemical energy and electrical energy bidirectionally. For example, the battery 150 may convert chemical energy into electrical energy and may supply the converted electrical energy to the display 160 and various components or modules mounted on the printed circuit board 120. Alternatively, the battery 150 may convert and store electrical energy supplied from the outside into chemical energy. According to an embodiment, a power management module for managing the charging and discharging of the battery 150 may be provided on the printed circuit board 120.

The display 160 may be viewable through a portion of the cover glass 112. The display 160 may be electrically connected with the printed circuit board 120, and may output content (e.g., a text, an image, a video, an icon, a widget, a symbol, or the like) or may receive a touch input (e.g., a touch, a gesture, a hovering, or the like) from the user.

The shielding layer 170 may be interposed between the display 160 and the side member 116. The shielding layer 170 may shield an electro-magnetic wave generated between the display 160 and the printed circuit board 120 to prevent an electro-magnetic interference between the display 160 and the printed circuit board 120.

In the specification, the description given with reference to FIGS. 1 to 3 may be identically applied to components having the same reference numerals/marks as the components of the electronic device 100 illustrated in FIGS. 1 and 3.

Figure 4A:
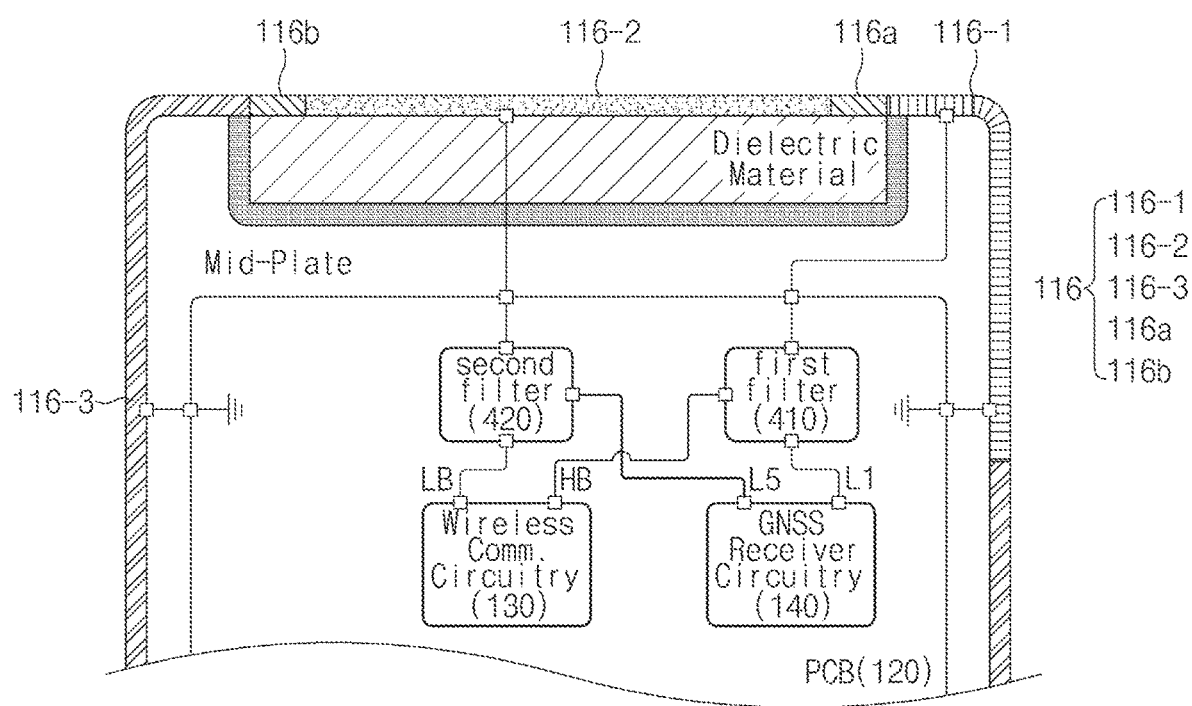
FIG. 4A is an enlarged view of a portion of an electronic device according to an embodiment.
Figure 4B:
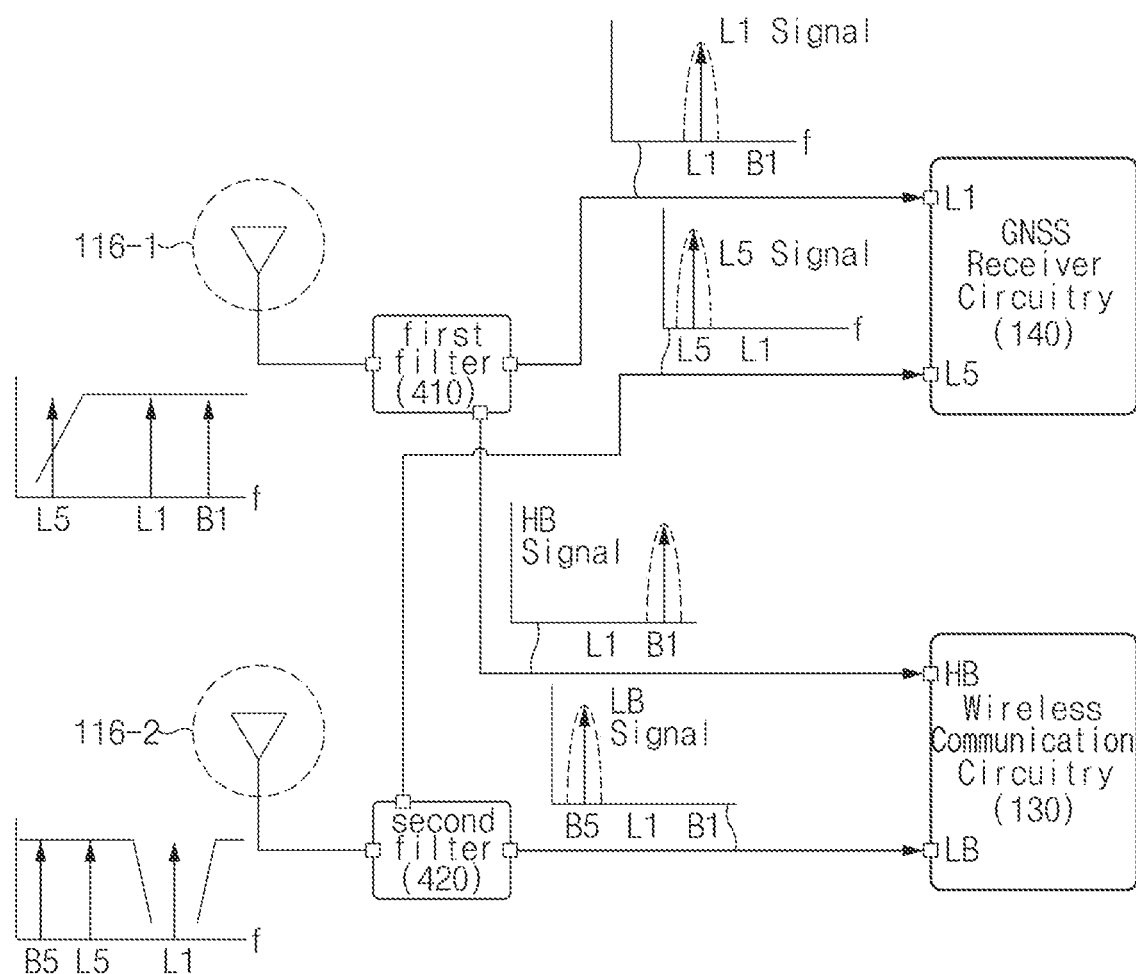
FIG. 4B is a circuit diagram illustrating some components included in an electronic device according to an embodiment.

FIG. 4A is an enlarged view of a portion of the electronic device 100 according to an embodiment. FIG. 4B is a circuit diagram illustrating some components included in the electronic device 100 according to an embodiment.

Referring to FIGS. 4A and 4B, the side member 116 may include the first conductive region 116-1, the second conductive region 116-2, a third conductive region 116-3, a first insulating region 116a, and a second insulating region 116b. The first insulating region 116a may be interposed between the first conductive region 116-1 and the second conductive region 116-2. The first insulating region 116a may be formed of an insulating material (e.g., plastic) and may electrically separate the first conductive region 116-1 and the second conductive region 116-2. The second insulating region 116b may also be formed of an insulating material (e.g., plastic) and may electrically separate the second conductive region 116-2 and the third conductive region 116-3.

The electronic device 100 may include a first filter 410 and a second filter 420. The first filter 410 and the second filter 420 may be disposed on the printed circuit board 120. The first filter 410 may be disposed on a connection path from the first conductive region 116-1 to the wireless communication circuitry 130 and on a connection path from the first conductive region 116-1 to the GNSS receiver circuitry 140. The second filter 420 may be disposed on a connection path from the second conductive region 116-2 to the wireless communication circuitry 130 and on a connection path from the second conductive region 116-2 to the GNSS receiver circuitry 140.

According to an embodiment, the first filter 410 may route signals received through the first conductive region 116-1 so as to be transmitted to the wireless communication circuitry 130 and/or the GNSS receiver circuitry 140. For example, the first filter 410 may transmit the first signal (e.g., the high band signal) to the wireless communication circuitry 130 and transmits the third signal (e.g., the GPS L1 signal) to the GNSS receiver circuitry 140. The second filter 420 may route signals received through the second conductive region 116-2 so as to be transmitted to the wireless communication circuitry 130 and/or the GNSS receiver circuitry 140. For example, the second filter 420 may transmit the second signal (e.g., the low band signal) to the wireless communication circuitry 130 and transmits the fourth signal (e.g., the GPS L5 signal) to the GNSS receiver circuitry 140.

According to an embodiment, the wireless communication circuitry 130 may transmit/receive various kinds of data to/from another electronic device 100 based on the first signal and the second signal. For example, the wireless communication circuitry 130 may transmit a message, a photo, a video, and the like to another electronic device or may receive a message, a photo, a video, and the like from another electronic device.

The GNSS receiver circuitry 140 may output the location information 10 of the electronic device 100 through the display 160 based on the third signal and the fourth signal. For example, in the case where the user executes a navigation app, the GNSS receiver circuitry 140 may output the location information 10 of the electronic device 100 along a movement path of the user together with a map.

Figure 5A:
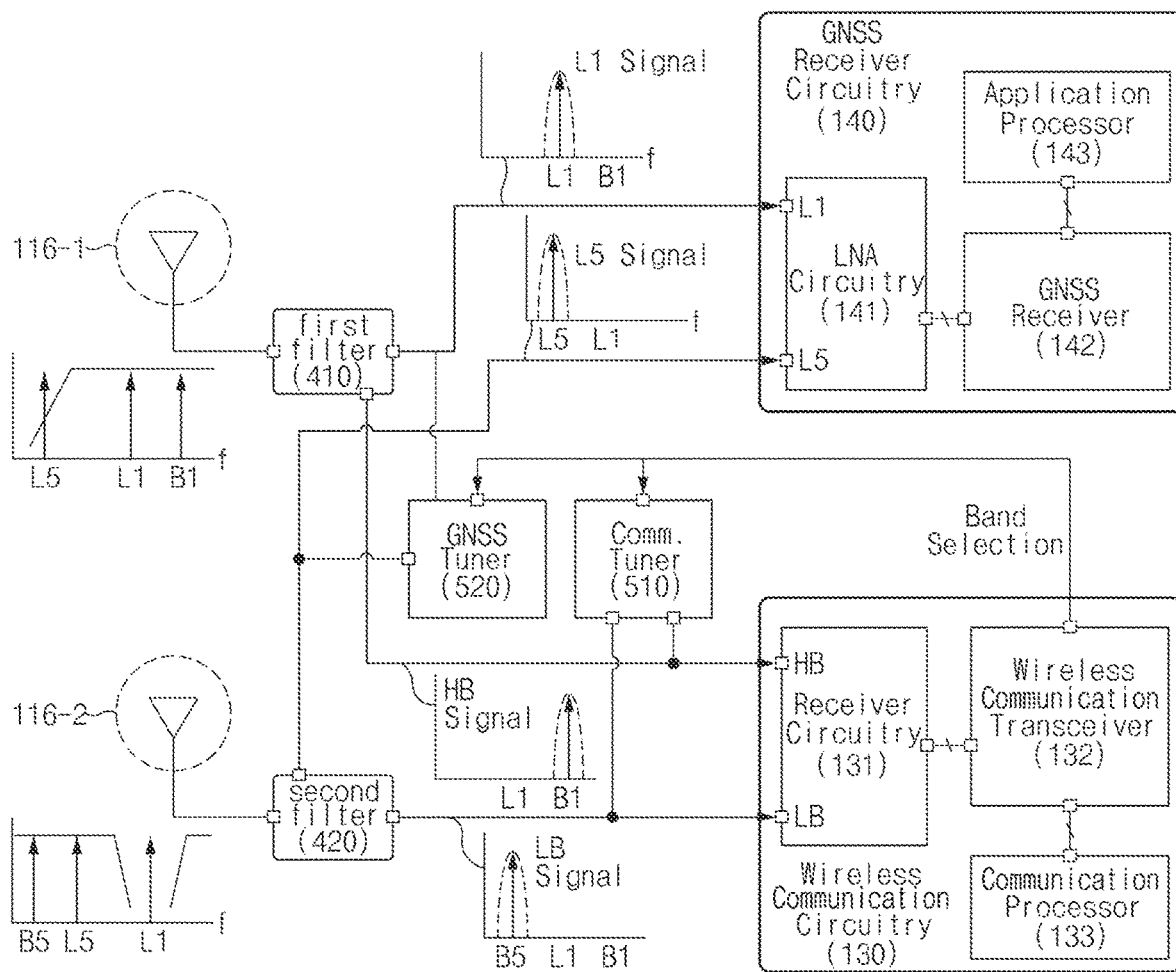
FIG. 5A is a circuit diagram illustrating some components included in an electronic device according to an embodiment in detail.

FIG. 5A is a circuit diagram illustrating some components included in the electronic device 100 according to an embodiment in detail. FIG. 5A is a detailed circuit diagram of FIG. 4B.

Referring to FIG. 5A, the electronic device 100 may include a communication tuner 510 and a GNSS tuner 520. Each of the communication tuner 510 and the GNSS tuner 520 may include at least one capacitive element (e.g., a capacitor) and an inductive element (e.g., an inductor).

The wireless communication circuitry 130 may include a receiver circuitry 131, a wireless communication transceiver 132, and a communication processor 133.

The receiver circuitry 131 may receive the first signal (e.g., the high band signal) in the first frequency band from the first filter 410. Also, the receiver circuitry 131 may receive the second signal (e.g., the low band signal) in the second frequency band from the second filter 420.

The wireless communication transceiver 132 may change at least one of a capacitance and an inductance of the communication tuner 510 and the GNSS tuner 520 and thus may change frequency bands of signals that the first conductive region 116-1 and the second conductive region 116-2 transmit/receive. For example, in the case of intending to receive a B20 signal while receiving a B5 signal through the second conductive region 116-2, the wireless communication transceiver 132 may change at least one of a capacitance and an inductance of the communication tuner 510. For another example, the wireless communication transceiver 132 may change at least one of a capacitance and an inductance of the GNSS tuner 520 and thus may change a frequency band of a GNSS signal to be transmitted/received.

According to an embodiment, the wireless communication transceiver 132 may modulate or demodulate the first signal and/or the second signal. The communication processor 133 may transmit/receive various kinds of data to/from another electronic device based on the first signal and the second signal thus modulated or demodulated. For example, the wireless communication circuitry 130 may transmit a message, a photo, a video, and the like to another electronic device or may receive a message, a photo, a video, and the like from another electronic device.

The GNSS receiver circuitry 140 may include a low noise amplifier (LNA) circuitry 141, a GNSS receiver 142, and an application processor 143.

The LNA circuitry 141 may receive the third signal (e.g., the GPS L1 signal) and the fourth signal (e.g., the GPS L5 signal) from the first filter 410 and the second filter 420. The LNA circuitry 141 may amplify the third signal and the fourth signal thus received.

The GNSS receiver 142 may demodulate the third signal and the fourth signal thus amplified.

The application processor 143 may output the location information 10 of the electronic device 100 through the display 160 based on the third signal and the fourth signal thus demodulated. For example, in the case where the user executes a navigation app, the GNSS receiver circuitry 140 may output the location information 10 of the electronic device 100 along a movement path of the user together with a map.

Figure 5B:
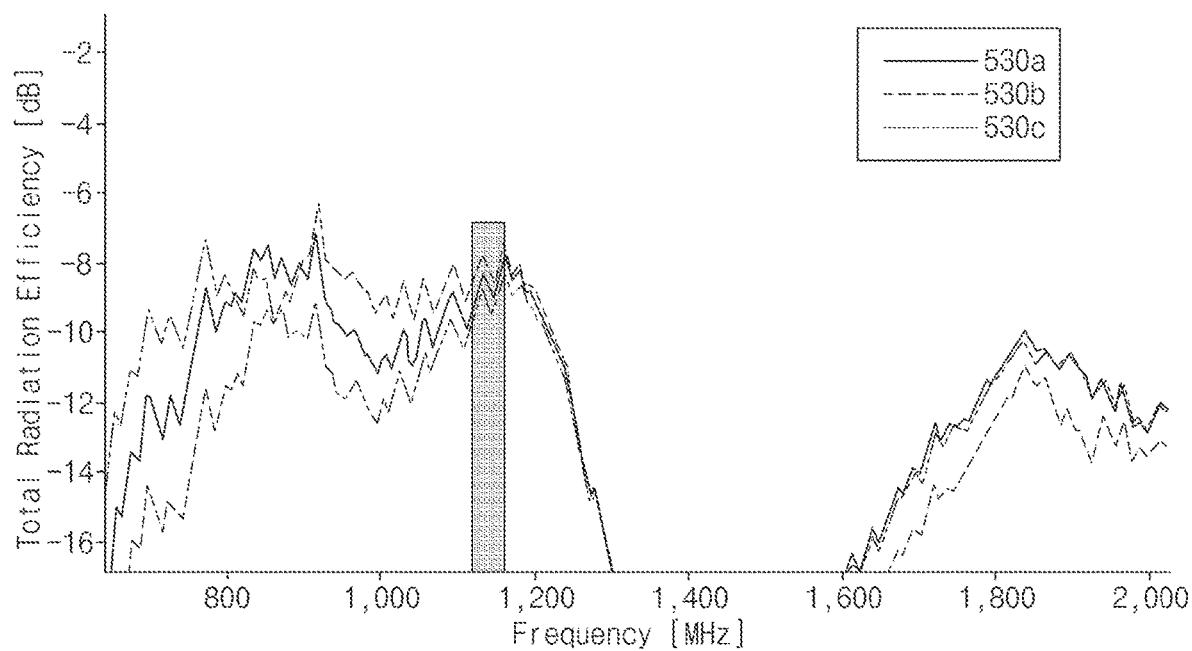
FIG. 5B illustrates GNSS signal receiving performance of an electronic device according to various embodiments.

FIG. 5B illustrates GNSS signal receiving performance of an electronic device according to various embodiments. FIG. 5B shows GNSS signal (e.g., fourth signal) receiving performance of the electronic device 100 described with reference to FIGS. 1 to 5A.

A first graph 530a indicates the fourth signal receiving performance of the GNSS receiver circuitry 140 when the wireless communication circuitry 130 receives the B5 signal through the second conductive region 116-2 and the communication tuner 510. A second graph 530b indicates the fourth signal receiving performance of the GNSS receiver circuitry 140 when the wireless communication circuitry 130 receives a B8 signal through the second conductive region 116-2 and the communication tuner 510. A third graph 530c indicates the fourth signal receiving performance of the GNSS receiver circuitry 140 when the wireless communication circuitry 130 receives the B20 signal through the second conductive region 116-2 and the communication tuner 510.

Comparing the first graph 530a, the second graph 530b, and the third graph 530c, the fourth signal receiving performance may be uniform from about 1164 MHz to about 1189 MHz by the GNSS tuner 520. That is, the fourth signal receiving performance may maintain about −9 dB to about −8 dB from 1164 MHz to 1189 MHz. Because an electronic device according to a comparative example does not include the GNSS tuner 520, GNSS signal receiving performance thereof may be unstable. However, the electronic device 100 according to another embodiment may include the GNSS tuner 520, and thus, stable GNSS signal receiving performance may be secured. In the specification, the description associated with the fourth signal may also be applied to the third signal.

Figure 6A:
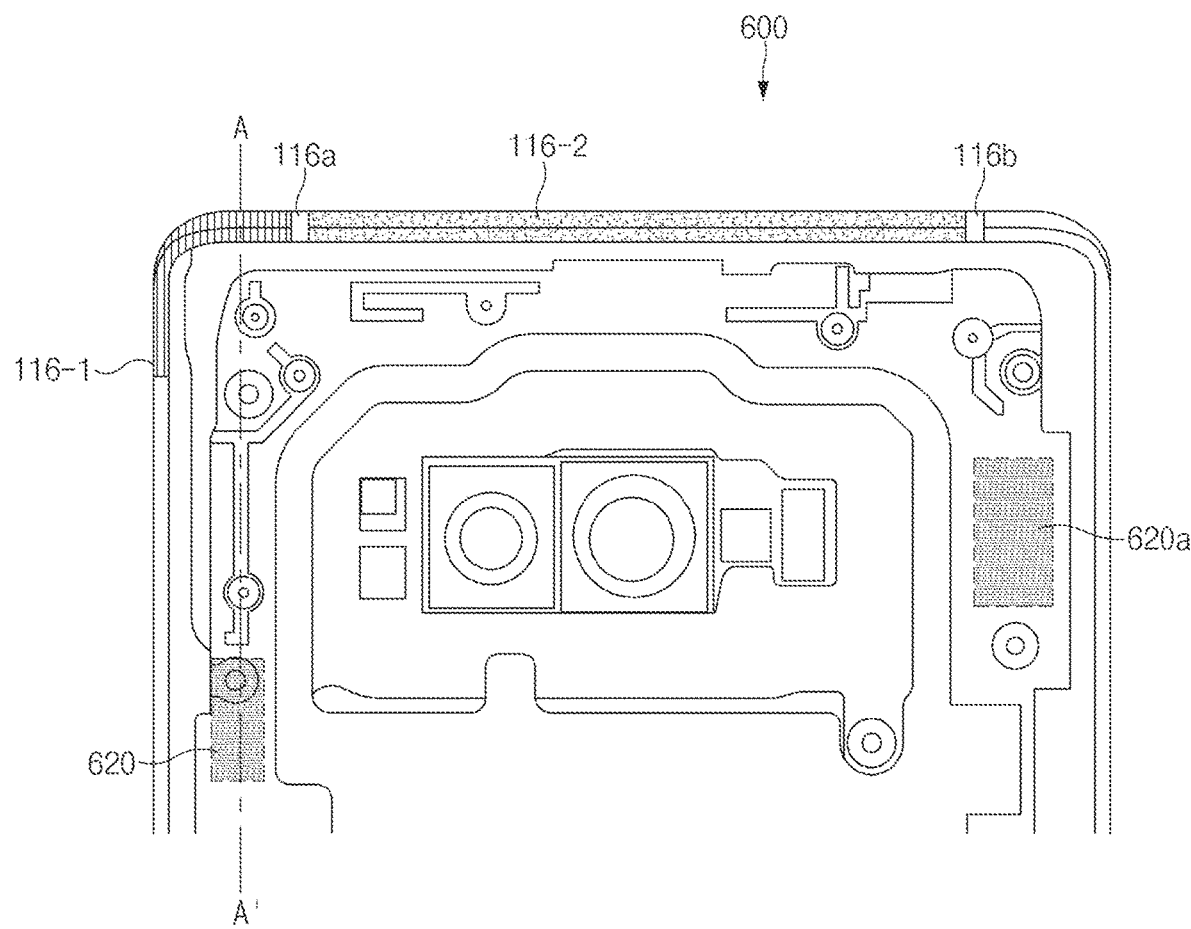
FIG. 6A is an enlarged view of a portion of an electronic device according to another embodiment.
Figure 6B:
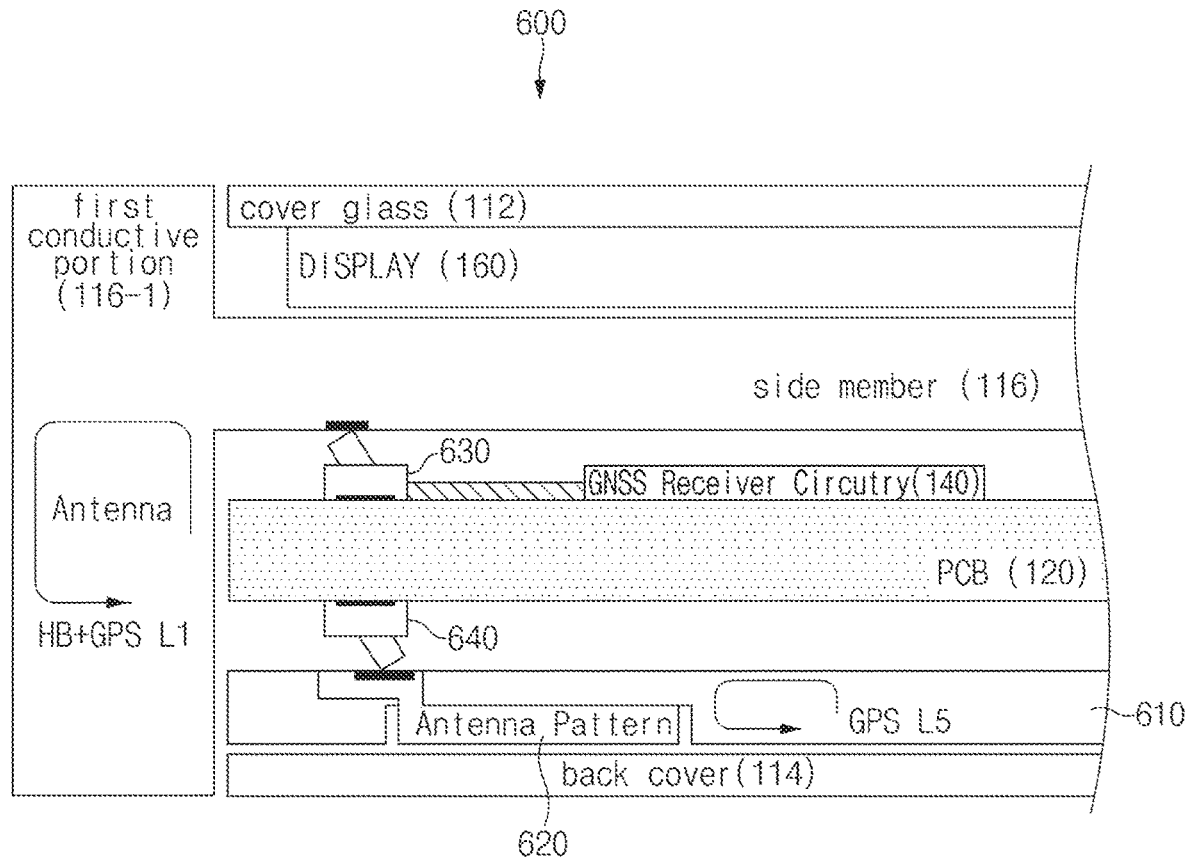
FIG. 6B is a cross-sectional view of an electronic device according to another embodiment.

FIG. 6A is an enlarged view of a portion of an electronic device according to another embodiment. FIG. 6B is a cross-sectional view of an electronic device according to another embodiment. FIG. 6B shows a cross section taken along line A-A' of FIG. 6A.

Referring to FIGS. 6A and 6B, an electronic device 600 may include the cover glass 112, the back cover 114, the first conductive region 116-1, the second conductive region 116-2, the printed circuit board 120, the GNSS receiver circuitry 140, the display 160, an antenna mounting member 610, a laser direct structuring (LDS) antenna 620, a first connection member 630, and a second connection member 640. The description given with reference to FIGS. 1 to 5A may be applied to the cover glass 112, the back cover 114, the first conductive region 116-1, the second conductive region 116-2, the printed circuit board 120, the GNSS receiver circuitry 140, and the display 160.

The antenna mounting member 610 may be interposed between the printed circuit board 120 and the back cover 114. The antenna mounting member 610 that is a component for installing the LDS antenna 620 may be formed of a non-conductive material (e.g., plastic). According to an embodiment, the antenna mounting member 610 may be disposed in an "a" region 620a.

The LDS antenna 620 is illustrated in FIGS. 6A and 6B as disposed on the antenna mounting member 610, but a flexible printed circuit board (FPCB) antenna may be disposed on the LDS antenna 620. In the specification, the LDS antenna 620 and the FPCB antenna may be referred to as a conductive pattern.

The LDS antenna 620 may be electrically connected with the GNSS receiver circuitry 140. The GNSS receiver circuitry 140 may receive the fourth signal (e.g., the GPS L5 signal) in the fourth frequency band by using the LDS antenna 620. The GNSS receiver circuitry 140 may receive the third signal (e.g., the GPS L1 signal) in the third frequency band through the first conductive region 116-1, and the GNSS receiver circuitry 140 may output the location information 10 of the electronic device 600 through the display 160 based on the third signal and the fourth signal.

An electronic device according to a comparative example may not be easy to receive GNSS signals in a multi-band. As such, the electronic device according to the comparative example may generate location information of the electronic device based on one of the third signal and the fourth signal, and the location information of the electronic device may be inaccurate. However, the electronic device 600 according to an embodiment may receive GNSS signals in different frequency bands by using the first conductive region 116-1 and the LDS antenna 620. Because the electronic device 600 is capable of generating location information based on the GNSS signals in the different frequency bands, the electronic device 600 may provide accurate location information to the user.

Components included in the electronic device 600 according to an embodiment may be connected through the first connection member 630 and the second connection member 640. For example, the printed circuit board 120 and the side member 116 may be connected through the first connection member 630, and the printed circuit board 120 and the LDS antenna 620 may be connected through the second connection member 640. In the specification, the first connection member 630 and the second connection member 640 may be referenced to as a C-clip.

Figure 7:
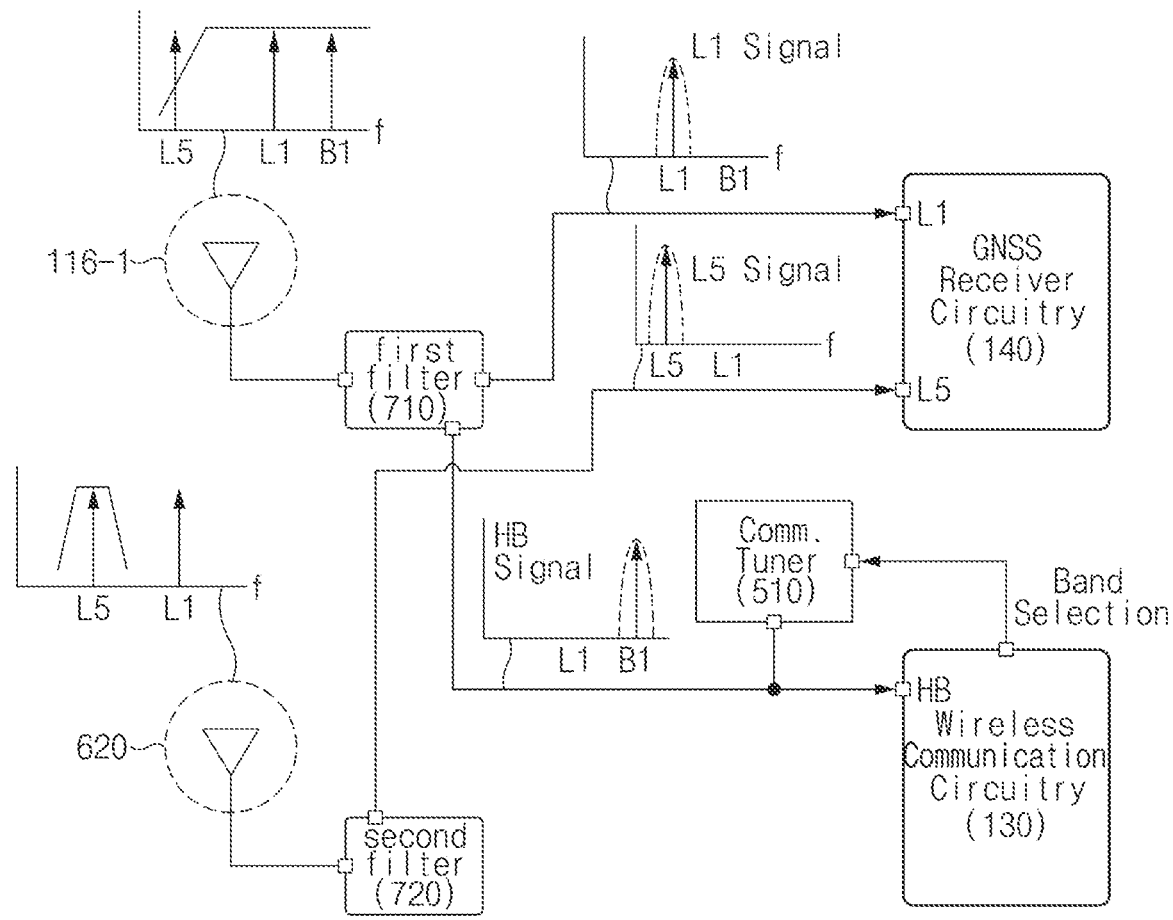
FIG. 7 is a circuit diagram illustrating some components included in an electronic device according to another embodiment.

FIG. 7 is a circuit diagram illustrating some components included in an electronic device according to another embodiment. FIG. 7 is a circuit diagram illustrating some components included in the electronic device 600 illustrated in FIG. 6A.

Referring to FIG. 7, the electronic device 600 may include a first filter 710 and a second filter 720. The first filter 710 and the second filter 720 may be disposed on the printed circuit board 120. The first filter 710 may be disposed on a connection path from the first conductive region 116-1 to the wireless communication circuitry 130 and on a connection path from the first conductive region 116-1 to the GNSS receiver circuitry 140. The second filter 720 may be disposed on a connection path from the LDS antenna 620 to the GNSS receiver circuitry 140.

According to an embodiment, the first filter 710 may route signals received through the first conductive region 116-1 so as to be transmitted to the wireless communication circuitry 130 and/or the GNSS receiver circuitry 140. For example, the first filter 710 may transmit the first signal to the wireless communication circuitry 130 and transmits the third signal to the GNSS receiver circuitry 140. The second filter 720 may transmit the fourth signal received through the LDS antenna 620 to the GNSS receiver circuitry 140.

According to an embodiment, the wireless communication circuitry 130 may transmit/receive various kinds of data to/from another electronic device based on the first signal. For example, the wireless communication circuitry 130 may transmit a message, a photo, a video, and the like to another electronic device or may receive a message, a photo, a video, and the like from another electronic device.

The GNSS receiver circuitry 140 may output the location information 10 of the electronic device 600 through the display 160 based on the third signal and the fourth signal. For example, in the case where the user executes a navigation app, the GNSS receiver circuitry 140 may output the location information 10 of the electronic device 600 along a movement path of the user together with a map.

Figure 8:
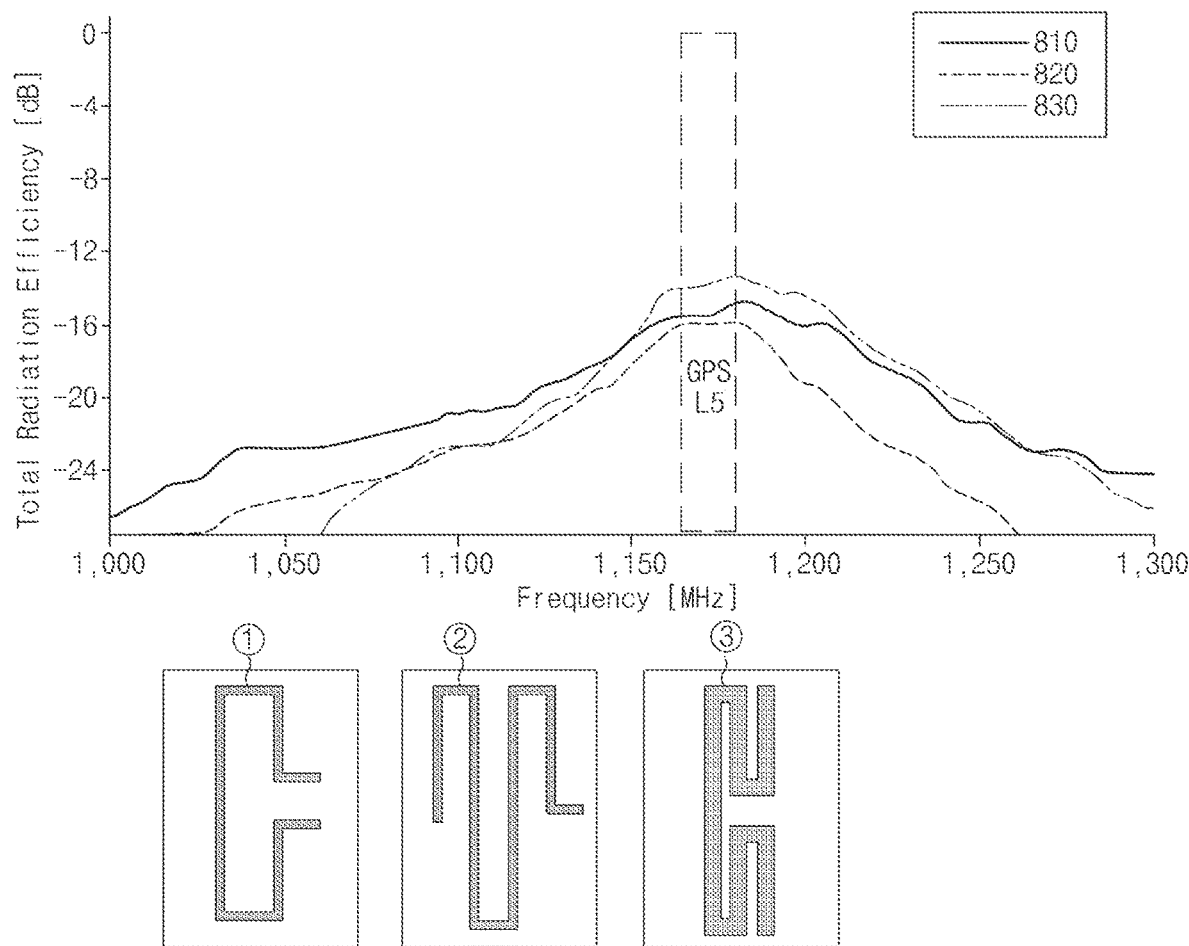
FIG. 8 illustrates GNSS signal receiving performance of an electronic device according to various embodiments.

FIG. 8 illustrates GNSS signal receiving performance of an electronic device according to various embodiments. FIG. 8 illustrates fourth signal (e.g., the GPS L5 signal) receiving performance according to a shape change of the LDS antenna 620.

Referring to FIG. 8, an "a" graph 810 indicates the fourth signal receiving performance when the LDS antenna 620 has a first shape ①. A "b" graph 820 indicates the fourth signal receiving performance when the LDS antenna 620 has a second shape ②. A "c" graph 830 indicates the fourth signal receiving performance when the LDS antenna 620 has a third shape ③.

Comparing the "a" graph 810, the "b" graph 820, and the "c" graph 830, as a shape of the LDS antenna 620 changes, the fourth signal receiving performance of the electronic device 600 may somewhat change in the fourth frequency band (e.g., 1164 MHz to 1189 MHz). For example, the fourth signal receiving performance when the LDS antenna 620 has the first shape ① may be improved more than the fourth signal receiving performance when the LDS antenna 620 has the second shape ②. For another example, the fourth signal receiving performance when the LDS antenna 620 has the third shape ③ may be improved more than the fourth signal receiving performance when the LDS antenna 620 has the second shape ①.

According to an embodiment, regardless of a shape of the LDS antenna 620, the fourth signal receiving performance of the electronic device 600 may be higher than or equal to a given level (e.g., −15 dB) in the fourth frequency band (e.g., 1164 MHz to 1189 MHz). An electronic device according to a comparative example may not be easy to receive the fourth signal. However, the electronic device 600 according to an embodiment may receive the fourth signal (or a GNSS signal) in the fourth frequency band by using the LDS antenna 620 and may receive the third signal (or a GNSS signal) in the third frequency band through the first conductive region 116-1. As such, the electronic device 600 according to an embodiment may receive the GNSS signals in the multi-band.

Figure 9:
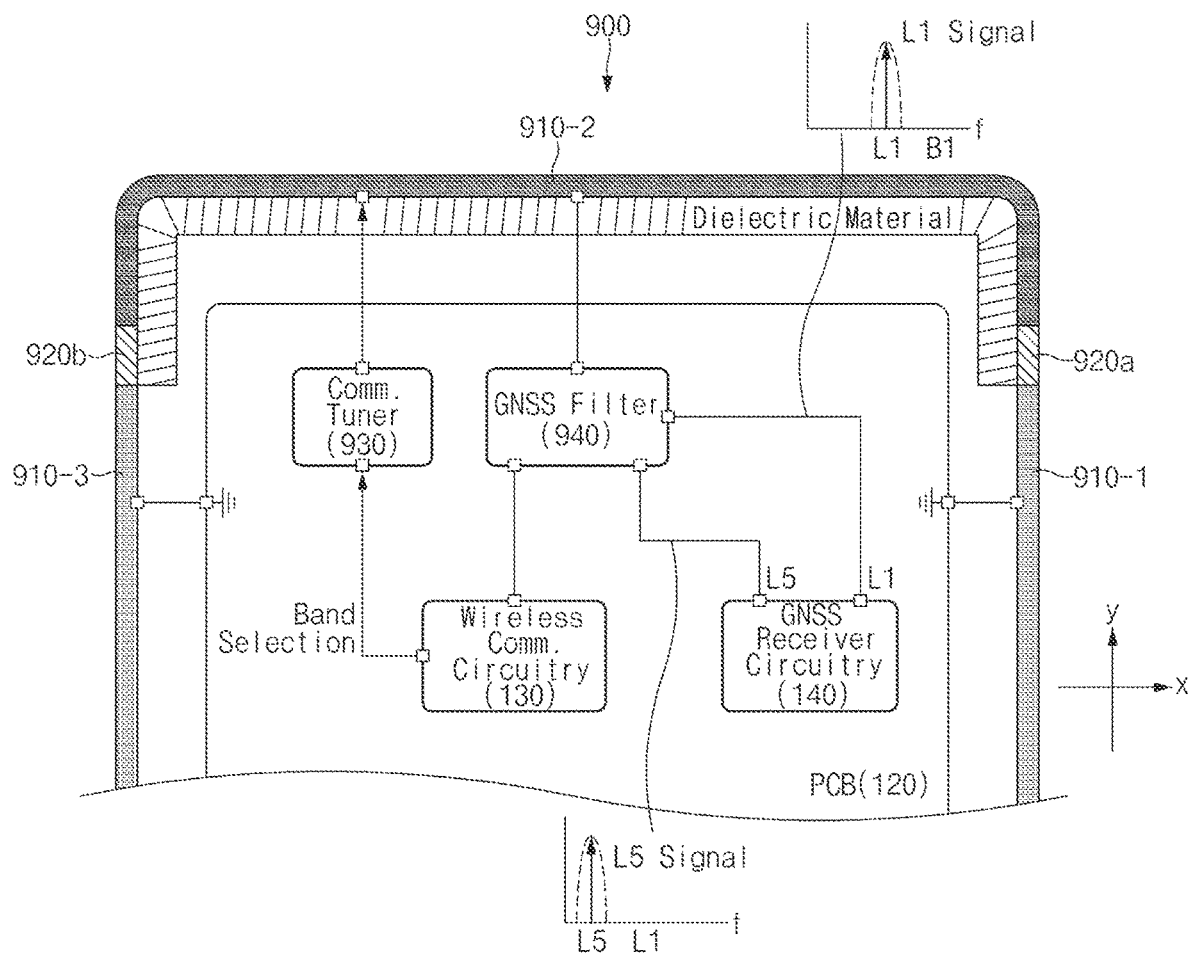
FIG. 9 is an enlarged view of a portion of an electronic device according to another embodiment.

FIG. 9 is an enlarged view of a portion of an electronic device according to another embodiment.

Referring to FIG. 9, an electronic device 900 may include a first conductive region 910-1, a second conductive region 910-2, a third conductive region 910-3, a first insulating region 920a, a second insulating region 920b, the printed circuit board 120, a communication tuner 930, a GNSS filter 940, the wireless communication circuitry 130, and the GNSS receiver circuitry 140.

The first conductive region 910-1 and the third conductive region 910-3 may be extended in a y direction and a −y direction. The second conductive region 910-2 may be extended in an x direction and a −x direction and may then be extended in the −y direction. As such, the second conductive region 910-2 may have a U shape.

The first insulating region 920a may be interposed between the first conductive region 910-1 and the second conductive region 910-2. The first insulating region 920a may electrically separate the first conductive region 910-1 and the second conductive region 910-2.

The second insulating region 920b may be interposed between the second conductive region 910-2 and the third conductive region 910-3. The second insulating region 920b may electrically separate the second conductive region 910-2 and the third conductive region 910-3.

The communication tuner 930, the GNSS filter 940, the wireless communication circuitry 130, and the GNSS receiver circuitry 140 may be disposed on the printed circuit board 120.

The wireless communication circuitry 130 may change a frequency band of a signal to be transmitted/received through the communication tuner 930. For example, the wireless communication circuitry 130 may allow the second conductive region 910-2 to receive the first signal (e.g., the high band signal), the third signal (e.g., the GPS L1 signal), and the fourth signal (e.g., the GPS L5 signal) through the communication tuner 930. Also, the wireless communication circuitry 130 may allow the second conductive region 910-2 to receive the second signal (e.g., the low band signal), the third signal, and the fourth signal through the communication tuner 930.

The GNSS filter 940 may route the first signal, the second signal, the third signal, and the fourth signal so as to be transmitted to the wireless communication circuitry 130 and/or the GNSS receiver circuitry 140. For example, the GNSS filter 940 may transmit the first signal and the second signal to the wireless communication circuitry 130 and transmits the third signal and the fourth signal to the GNSS receiver circuitry 140.

Figure 10:
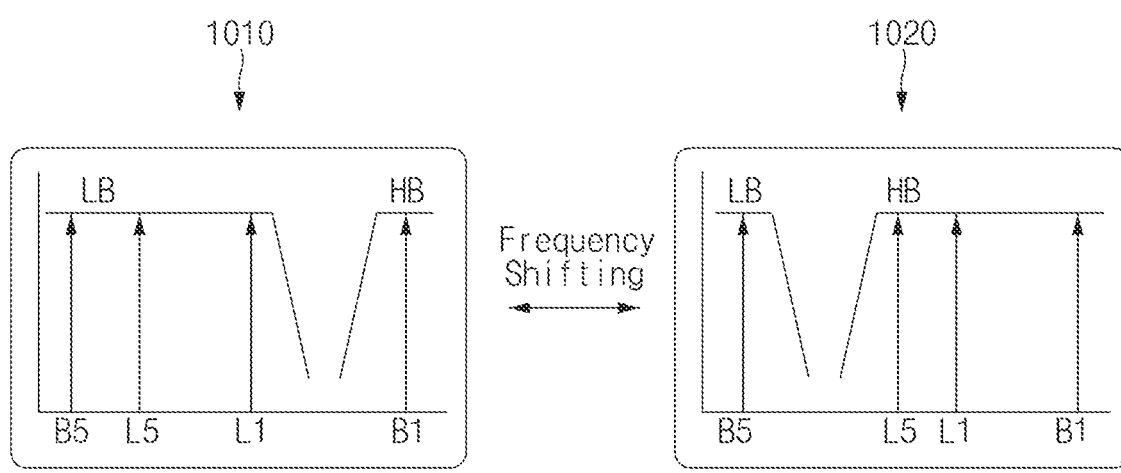
FIG. 10 illustrates frequency bands of an electronic device according to various embodiments.

FIG. 10 illustrates frequency bands of an electronic device according to various embodiments. FIG. 10 shows frequency bands that the electronic device 900 illustrated in FIG. 9 is capable of switching.

A graph 1010 indicates frequency bands in the case where the electronic device 900 receives the second signal, the third signal, and the fourth signal. A graph 1020 indicates frequency bands in the case where the electronic device 900 receives the first signal, the third signal, and the fourth signal.

Referring to FIG. 10, the wireless communication circuitry 130 may change a frequency band of a signal to be transmitted/received through the communication tuner 930. That is, the wireless communication circuitry 130 may allow the second conductive region 910-2 to receive the first signal (e.g., the high band signal), the third signal (e.g., the GPS L1 signal), and the fourth signal (e.g., the GPS L5 signal), in a state where the second conductive region 910-2 is receiving the second signal (e.g., the low band signal), the third signal, and the fourth signal through the communication tuner 930

In contrast, the wireless communication circuitry 130 may allow the second conductive region 910-2 to receive the second signal, the third signal, and the fourth signal, in a state where the second conductive region 910-2 is receiving the first signal, the third signal, and the fourth signal through the communication tuner 930 According to an embodiment, in the case where a handover occurs, the wireless communication circuitry 130 may search for a signal to change the low band signal to the high band signal, and vice versa.

An electronic device according to a comparative example may not be easy to receive GNSS signals in a multi-band. As such, the electronic device according to the comparative example may generate location information of the electronic device based on one of the third signal and the fourth signal, and the location information of the electronic device may be inaccurate. However, the electronic device 900 according to an embodiment may receive the GNSS signals in the multi-band (e.g., the third signal and the fourth signal). Because the electronic device 900 is capable of generating location information based on the GNSS signals in the multi-band, the electronic device 900 may provide accurate location information to the user.

An electronic device according to an embodiment may include a housing that includes a first plate, a second plate facing away from the first plate, and a side member surrounding a space between the first plate and the second plate and including a first conductive region and a second conductive region electrically separated from the first conductive region, a wireless communication circuitry that is disposed within the space, transmits/receives a first signal in a first frequency band ranging from 1.4 GHz to 6 GHz by using the first conductive region, and transmits/receives a second signal in a second frequency band ranging from 0.6 GHz to 1.4 GHz by using the second conductive region, and a GNSS receiver circuitry that is disposed within the space, receives a third signal in a third frequency band ranging from 1559 MHz to 1610 MHz by using the first conductive region, and receives a fourth signal in a fourth frequency band ranging from 1164 MHz to 1189 MHz by using the second conductive region.

The side member according to an embodiment may include a third conductive region, the second conductive region may be interposed between the first conductive region and the third conductive region, and the side member may further include a first insulating region that is interposed between the first conductive region and the second conductive region and is in contact with the first conductive region and the second conductive region, and a second insulating region that is interposed between the second conductive region and the third conductive region and is in contact with the second conductive region and the third conductive region.

The electronic device according to an embodiment may further include a first filter that is disposed on a connection path from the first conductive region to the wireless communication circuitry and a connection path from the first conductive region to the GNSS receiver circuitry, and a second filter that is disposed on a connection path from the second conductive region to the wireless communication circuitry and a connection path from the second conductive region to the GNSS receiver circuitry.

The first filter according to an embodiment may transmit the first signal to the wireless communication circuitry and may transmit the third signal to the GNSS receiver circuitry, and the second filter may transmit the second signal to the wireless communication circuitry and may transmit the fourth signal to the GNSS receiver circuitry.

The electronic device according to an embodiment may further include a GNSS tuner that is electrically connected with the first filter, the second filter, and the wireless communication circuitry. When a frequency band of at least one of the first signal and the second signal is changed, the wireless communication circuitry may change at least one of a capacitance and an inductance of the GNSS tuner.

The GNSS receiver circuitry according to an embodiment may include an amplifier circuit that amplifies the third signal and the fourth signal.

The GNSS receiver circuitry according to an embodiment may include a GNSS receiver that demodulates the third signal and the fourth signal.

The GNSS receiver circuitry according to an embodiment may further include a processor that calculates a location of the electronic device based on the demodulated signal.

The electronic device according to an embodiment may further include a display that outputs the location of the electronic device.

The electronic device according to an embodiment may further include a wireless communication tuner that is electrically connected with the first filter, the second filter, and the wireless communication circuitry, and the wireless communication circuitry may change at least one of a capacitance and an inductance of the wireless communication tuner for the purpose of changing a frequency band of at least one of the first signal and the second signal.

An electronic device according to an embodiment may include a housing that includes a first plate, a second plate facing away from the first plate, and a side member surrounding a space between the first plate and the second plate and including a first conductive region and a second conductive region electrically separated from the first conductive region, an antenna structure that is disposed within the space and includes a polymeric structure and a conductive pattern formed in the polymeric structure and/or on the polymeric structure, a wireless communication circuitry that is disposed within the space, transmits/receives a first signal in a first frequency band ranging from 1.4 GHz to 6 GHz by using the first conductive region, and transmits/receives a second signal in a second frequency band ranging from 0.6 GHz to 1.4 GHz by using the second conductive region, and a GNSS receiver circuitry that is disposed within the space, receives a third signal in a third frequency band ranging from 1559 MHz to 1610 MHz by using the first conductive region, and receives a fourth signal in a fourth frequency band ranging from 1164 MHz to 1189 MHz by using the second conductive region.

The side member according to an embodiment may include a third conductive region, the second conductive region may be interposed between the first conductive region and the third conductive region, and the side member may further include a first insulating region that is interposed between the first conductive region and the second conductive region and is in contact with the first conductive region and the second conductive region, and a second insulating region that is interposed between the second conductive region and the third conductive region and is in contact with the second conductive region and the third conductive region.

The electronic device according to an embodiment may include a first filter that is disposed on a connection path from the first conductive region to the wireless communication circuitry and a connection path from the first conductive region to the GNSS receiver circuitry, and a second filter that is disposed on a connection path from the conductive pattern to the GNSS receiver circuitry.

The first filter according to an embodiment may transmit the first signal to the wireless communication circuitry and may transmit the third signal to the GNSS receiver circuitry, and the second filter may transmit the fourth signal to the GNSS receiver circuitry.

The electronic device according to an embodiment may further include a wireless communication tuner that is electrically connected with the first filter and the wireless communication circuitry, and the wireless communication circuitry may change at least one of a capacitance and an inductance of the wireless communication tuner for the purpose of changing a frequency band of at least one of the first signal and the second signal.

An electronic device according to an embodiment may include a housing that includes a first plate, a second plate facing away from the first plate, and a side member surrounding a space between the first plate and the second plate and including a first conductive region and a second conductive region electrically separated from the first conductive region, a wireless communication circuitry that is disposed within the space, transmits/receives a first signal in a first frequency band ranging from 1.4 GHz to 6 GHz by using the second conductive region, and transmits/receives a second signal in a second frequency band ranging from 0.6 GHz to 1.4 GHz by using the second conductive region, a GNSS receiver circuitry that is disposed within the space, receives a third signal in a third frequency band ranging from 1559 MHz to 1610 MHz by using the second conductive region, and receives a fourth signal in a fourth frequency band ranging from 1164 MHz to 1189 MHz by using the second conductive region, and a wireless communication tuner that is electrically connected with the second conductive region and the wireless communication circuitry and changes a frequency band of at least one of the first signal and the second signal.

The side member according to an embodiment may include a third conductive region, the second conductive region may be interposed between the first conductive region and the third conductive region, and the side member may further include a first insulating region that is interposed between the first conductive region and the second conductive region and is in contact with the first conductive region and the second conductive region, and a second insulating region that is interposed between the second conductive region and the third conductive region and is in contact with the second conductive region and the third conductive region.

One end of the second conductive region according to an embodiment may be bent at the first insulating region and may then be extended, and an opposite end of the second conductive region may be bent at the second insulating region and may then be extended.

The electronic device according to an embodiment may further include a filter circuit that is electrically connected with the second conductive region, the wireless communication circuitry, and the GNSS receiver circuitry, and the filter circuit may selectively pass the first signal and the second signal from the second conductive region to the wireless communication circuitry.

The wireless communication circuitry according to an embodiment may change at least one of a capacitance and an inductance of the wireless communication tuner for the purpose of changing a frequency band of at least one of the first signal and the second signal.

Figure 11:
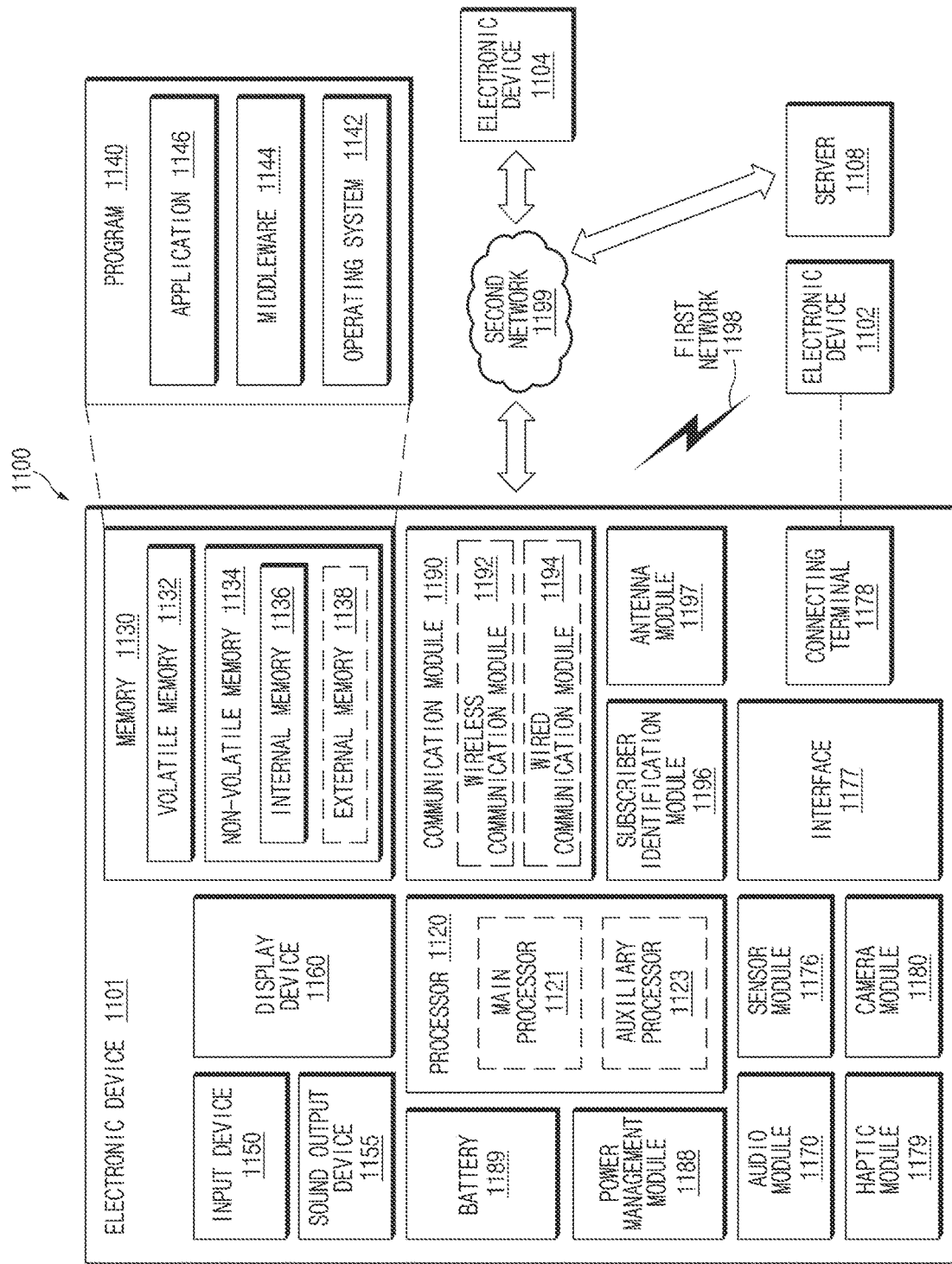
FIG. 11 is a block diagram of an electronic device in a network environment, according to various embodiments.

FIG. 11 is a block diagram of an electronic device 1101 in a network environment 1100, according to various embodiments.

Referring to FIG. 11, the electronic device 1101 in the network environment 1100 may communicate with an electronic device 1102 over a first network 1198 (e.g., a short range wireless communication network) or may communicate with an electronic device 1104 or a server 1108 over a second network 1199 (e.g., a long distance wireless communication network). According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, or an antenna module 1197. In any embodiment, at least one (e.g., the display device 1160 or the camera module 1180) of the components may be omitted from the electronic device 1101, or one or more other components may be further included in the electronic device 1101. In any embodiment, some of the components may be implemented with a single integrated circuit. For example, the sensor module 1176 (e.g., a fingerprint sensor, an iris sensor, or an illumination sensor) may be embedded in the display device 1160 (e.g., a display).

The processor 1120 may execute, for example, software (e.g., a program 1140) to control at least one other component (e.g., a hardware or software component) of the electronic device 1101 connected to the processor 1120, and may perform various data processing or operations. According to an embodiment, as at least a part of the data processing or operations, the processor 1120 may load a command or data received from any other component (e.g., the sensor module 1176 or the communication module 1190) to a volatile memory 1132, may process the command or data stored in the volatile memory 1132, and may store processed data in a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which may be operated independently of or together with the main processor 1121. Additionally or alternatively, the auxiliary processor 1123 may be configured to use lower power than the main processor 1121 or to be specialized for a specified function. The auxiliary processor 1123 may be implemented separately from the main processor 1121 or may be implemented as a part of the main processor 1121.

The auxiliary processor 1123 may control at least a part of a function or states associated with at least one component (e.g., the display device 1160, the sensor module 1176, or the communication module 1190) of the electronic device 1101, for example, instead of the main processor 1121 while the main processor 1121 is in an inactive (e.g., sleep) state and together with the main processor 1121 while the main processor 1121 is in an active (e.g., an application execution) state. According to an embodiment, the auxiliary processor 1123 (e.g., an image signal processor or a communication processor) may be implemented as a part of any other component (e.g., the camera module 1180 or the communication module 1190) which is functionally (or operatively) associated with the auxiliary processor 1123.

The memory 1130 may store various data which are used by at least one component (e.g., the processor 1120 or the sensor module 1176) of the electronic device 1101. The data may include, for example, software (e.g., the program 1140), or input data or output data associated with a command of the software. The memory 1130 may include the volatile memory 1132 or the nonvolatile memory 1134.

The program 1140 may be stored in the memory 1130 as software, and may include, for example, an operating system 1142, a middleware 1144, or an application 1146.

The input device 1150 may receive a commands or data which will be used by a component (e.g., the processor 1120) of the electronic device 1101, from the outside (e.g., a user) of the electronic device 1101. The input device 1150 may include, for example, a microphone, a mouse, or a keyboard.

The sound output device 1155 may output a sound signal to the outside of the electronic device 1101. The sound output device 1155 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1160 may visually provide information to the outside (e.g., the user) of the electronic device 1101. The display device 1160 may include, for example, a display, a hologram device, or a control circuit for controlling a projector and a corresponding device. According to an embodiment, the display device 1160 may include a touch circuitry configured to sense a touch, or a sensor circuitry (e.g., a pressure sensor) configured to measure the strength of force generated by the touch.

The audio module 1170 may convert sound to an electrical signal, or reversely, may convert an electrical signal to sound. According to an embodiment, the audio module 1170 may obtain sound through the input device 1150, or may output sound through the sound output device 1155, or through an external electronic device (e.g., the electronic device 1102) (e.g., a speaker or a headphone) directly or wirelessly connected with the electronic device 1101.

The sensor module 1176 may sense an operation state (e.g., power or a temperature) of the electronic device 1101 or an external environment state (e.g., a user state), and may generate an electrical signal or a data value corresponding the sensed state. According to an embodiment, the sensor module 1176 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1177 may support one or more specified protocols that may be used to directly and wirelessly connect the electronic device 1101 with an external electronic device (e.g., the electronic device 1102). According to an embodiment, the interface 1177 may include, for example, a high definition multimedia interface (HDMI), a universal serial bus (USB) interface, a secure digital (SD) card interface, or an audio interface.

A connection terminal 1178 may include a connector that may allow the electronic device 1101 to be physically connected with an external electronic device (e.g., the electronic device 1102). According to an embodiment, the connection terminal 1178 may include, for example, a HDMI connector, a USB connector, a SD card connector, or an audio connector (e.g., a headphone connector).

The haptic module 1179 may convert an electrical signal to a mechanical stimulation (e.g., vibration or movement) or an electrical stimulation which the user may perceive through the sense of touch or the sense of movement. According to an embodiment, the haptic module 1179 may include, for example, a motor, a piezoelectric sensor, or an electrical stimulation device.

The camera module 1180 may photograph a still image and a video. According to an embodiment, the camera module 1180 may include one or more lenses, image sensors, image signal processors, or flashes (or electrical flashes).

The power management module 1188 may manage the power which is supplied to the electronic device 1101. According to an embodiment, the power management module 1188 may be implemented, for example, as at least a part of a power management integrated circuit (PMIC).

The battery 1189 may power at least one component of the electronic device 1101. According to an embodiment, the battery 1189 may include, for example, a primary cell not recharged, a secondary cell rechargeable, or a fuel cell.

The communication module 1190 may establish a direct (or wired) communication channel or a wireless communication channel between the electronic device 1101 and an external electronic device (e.g., the electronic device 1102, the electronic device 1104, or the server 1108) or may perform communication through the established communication channel. The communication module 1190 may include one or more communication processors which is operated independently of the processor 1120 (e.g., an application processor) and supports direct (or wired) communication or wireless communication. According to an embodiment, the communication module 1190 may include a wireless communication module 1192 (e.g., a cellular communication module, a short range wireless communication module, or a global navigation satellite system (GNSS) communication module) or a wired communication module 1194 (e.g., a local area network (LAN) communication module or a power line communication module). A corresponding communication module of such communication modules may communicate with an external electronic device over the first network 1198 (e.g., a short range communication network such as Bluetooth, Wi-Fi direct, or infrared data association (IrDA)) or the second network 1199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1192 may verify and authenticate the electronic device 1101 within a communication network, such as the first network 1198 or the second network 1199, by using subscriber information (e.g., international mobile subscriber identity (IMSI)) stored in the subscriber identification module 1196.

The antenna module 1197 may transmit a signal or a power to the outside (e.g., an external electronic device) or may receive a signal or a power from the outside. According to an embodiment, the antenna module 1197 may include one or more antennas, and at least one antenna which is suitable for a communication scheme used in a computer network such as the first network 1198 or the second network 1199 may be selected, for example, by the communication module 1190 from the one or more antennas. The signal or power may be exchanged between the communication module 1190 and an external electronic device through the selected at least one antenna or may be received from the external electronic device through the selected at least one antenna and the communication module 1190.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1101 and the external electronic device 1104 through the server 1108 connecting to the second network 1199. Each of the electronic devices 1102 and 1104 may be a device, the kind of which is the same as or different from a kind of the electronic device 1101. According to an embodiment, all or a part of operations to be executed in the electronic device 1101 may be executed in one or more external devices of the external electronic devices 1102, 1104, or 1108. For example, in the case where the electronic device 1101 should perform any function or service automatically or in response to a request from the user or any other device, the electronic device 1101 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1101. The electronic device 1101 may process received result as it is or additionally, and may provide a result of the processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1140) including an instruction stored in a machine-readable storage medium (e.g., an internal memory 1136 or an external memory 1138) readable by a machine (e.g., the electronic device 1101). For example, the processor (e.g., the processor 1120) of a machine (e.g., the electronic device 1101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding component prior to the integration. According to various embodiments, operations performed by a module, a programming, or other components may be executed sequentially, in parallel, repeatedly, or in a heuristic method, or at least some operations may be executed in different sequences, omitted, or other operations may be added.

Which is claimed is:

1. A portable communication device comprising:
a housing including a first conductive member forming a first portion of a side surface of the portable communication device and a second conductive member forming a second portion of the side surface;
a wireless communication circuitry configured to transmit or receive a first signal in a first frequency band corresponding to cellular communication through the first conductive member;
a global navigation satellite system (GNSS) receiver circuitry configured to receive a second signal in a second frequency band corresponding to a GNSS through the first conductive member and to receive a third signal in a third frequency band corresponding to the GNSS and different from the second frequency band through the second conductive member;
a first filter disposed on a connection path from the first conductive member to the wireless communication circuitry and a connection path from the first conductive member to the GNSS receiver circuitry; and
a second filter disposed on a connection path from the second conductive member to the GNSS receiver circuitry,
wherein the GNSS receiver circuitry is configured to generate location information of the portable communication device based at least partially on the second signal and the third signal.

2. The portable communication device of claim 1, wherein the GNSS receiver circuitry is configured to concurrently receive the second signal through the first conductive member and the third signal through the second conductive member.

3. The portable communication device of claim 1, wherein the GNSS receiver circuitry is configured to receive the third signal through the second conductive member while the first signal is transmitted or received by the wireless communication circuitry through the first conductive member.

4. The portable communication device of claim 1, wherein the wireless communication circuitry configured to transmit or receive a fourth signal in a fourth frequency band at least partially different from the first frequency band corresponding to the cellular communication through the second conductive member while the third signal is received through the second conductive member.

5. The portable communication device of claim 1, wherein the second frequency band ranges from 1164 MHz to 1189 MHz.

6. The portable communication device of claim 1, wherein the third frequency band ranges from 1559 MHz to 1610 MHz.

7. The portable communication device of claim 1, wherein the first conductive member and the second conductive member are spaced from each other, with at least one insulating member interposed therebetween.

8. The portable communication device of claim 1, further comprising:
a first connection member connected with the first conductive member; and
a second connection member connected with the second conductive member,
wherein the wireless communication circuitry is capable of transmitting or receiving the first signal through the first connection member, and
wherein the GNSS receiver circuitry is capable of receiving the second signal through the first connection member and capable of receiving the third signal through the second connection member.

9. The portable communication device of claim 1,
wherein the first signal is transmitted to the wireless communication circuitry through the first filter,
wherein the second signal is transmitted to the GNSS receiver circuitry through the first filter, and
wherein the third signal is transmitted to the GNSS receiver circuitry through the second filter.

10. The portable communication device of claim 1, further comprising:
a GNSS tuner electrically connected with the first filter, the second filter, and the wireless communication circuitry,
wherein, when a frequency band of the first signal is changed, the wireless communication circuitry is configured to change at least one of a capacitance and an inductance of the GNSS tuner.

11. A portable communication device comprising:
a housing including a first conductive member forming a first side surface of the portable communication device and a second conductive member forming at least a part of a second side surface of the portable communication device, wherein the first side surface and the second side surface are perpendicular to each other;
a wireless communication circuitry configured to transmit or receive a first signal in a first frequency band corresponding to cellular communication through the first conductive member;
a global navigation satellite system (GNSS) receiver circuitry configured to receive a second signal in a second frequency band corresponding to a GNSS through the first conductive member, and to receive a third signal in a third frequency band corresponding to the GNSS through the second conductive member;
a first filter disposed on a connection path from the first conductive member to the wireless communication circuitry and a connection path from the first conductive member to the GNSS receiver circuitry; and
a second filter disposed on a connection path from the second conductive member to the GNSS receiver circuitry,
wherein the first signal is transmitted to the wireless communication circuitry through the first filter,
wherein the second signal is transmitted to the GNSS receiver circuitry through the first filter,
wherein the third signal is transmitted to the GNSS receiver circuitry through the second filter, and
wherein the GNSS receiver circuitry is configured to generate location information of the portable communication device based at least partially on the second signal and the third signal.

12. The portable communication device of claim 11, wherein the second conductive member is disposed adjacent to the first conductive member.

13. The portable communication device of claim 11, wherein the first side surface is a top side of the portable communication device.

14. The portable communication device of claim 11, wherein the GNSS receiver circuitry is configured to concurrently receive the second signal through the first conductive member and the third signal through the second conductive member.

15. The portable communication device of claim 11, wherein the GNSS receiver circuitry is configured to receive the third signal through the second conductive member while the first signal is transmitted or received by the wireless communication circuitry through the first conductive member.

16. The portable communication device of claim 11, wherein the wireless communication circuitry configured to transmit or receive a fourth signal in a fourth frequency band at least partially different from the first frequency band corresponding to the cellular communication through the second conductive member while the third signal is received through the second conductive member.

17. The portable communication device of claim 11, wherein the first frequency band ranges from 0.6 GHz to 1.4 GHz.

18. The portable communication device of claim 11, wherein the second frequency band ranges from 1164 MHz to 1189 MHz and the third frequency band ranges from 1559 MHz to 1610 MHz.

19. The portable communication device of claim 11, further comprising:
a first connection member connected with the first conductive member; and
a second connection member connected with the second conductive member,
wherein the wireless communication circuitry is capable of transmitting or receiving the first signal through the first connection member, and
wherein the GNSS receiver circuitry is capable of receiving the second signal through the first connection member and capable of receiving the third signal through the second connection member.

20. The portable communication device of claim 19, further comprising:
a GNSS tuner electrically connected with the first filter, the second filter, and the wireless communication circuitry,
wherein, when a frequency band of the first signal is changed, the wireless communication circuitry is configured to change at least one of capacitance and an inductance of the GNSS tuner.

21. A portable communication device comprising:
a housing including a first conductive member, a second conductive member, a first insulating member and a second insulating member, wherein the first conductive member forms a first side surface of the portable communication device and is disposed between the first insulating member and the second insulating member, and the second conductive member forms at least a part of a second side surface of the portable communication device;
a wireless communication circuitry configured to transmit or receive a first signal in a first frequency band corresponding to cellular communication through the first conductive member;
a global navigation satellite system (GNSS) receiver circuitry configured to receive a second signal in a second frequency band corresponding to a GNSS through the first conductive member, and to receive a third signal in a third frequency band corresponding to the GNSS through the second conductive member;
a first filter disposed on a connection path from the first conductive member to the wireless communication circuitry and a connection path from the first conductive member to the GNSS receiver circuitry; and
a second filter disposed on a connection path from the second conductive member to the GNSS receiver circuitry,
wherein the first signal is transmitted to the wireless communication circuitry through the first filter,
wherein the second signal is transmitted to the GNSS receiver circuitry through the first filter,
wherein the third signal is transmitted to the GNSS receiver circuitry through the second filter, and
wherein the GNSS receiver circuitry is configured to generate location information of the portable communication device based at least partially on the second signal and the third signal received.

22. The portable communication device of claim 21, wherein the second conductive member is disposed adjacent to the first conductive member.

23. The portable communication device of claim 21, wherein the first side surface is a top side of the portable communication device.

24. The portable communication device of claim 21, wherein the GNSS receiver circuitry is configured to concurrently receive the second signal through the first conductive member and the third signal through the second conductive member.

25. The portable communication device of claim 21, wherein the GNSS receiver circuitry is configured to receive the third signal through the second conductive member while the first signal is transmitted or received by the wireless communication circuitry through the first conductive member.

26. The portable communication device of claim 21, wherein the wireless communication circuitry is configured to transmit or receive a fourth signal in a fourth frequency band at least partially different from the first frequency band corresponding to the cellular communication through the second conductive member while the third signal is received through the second conductive member.

27. The portable communication device of claim 21, wherein the first frequency band ranges from 0.6 GHz to 1.4 GHz.

28. The portable communication device of claim 21, wherein the second frequency band ranges from 1164 MHz to 1189 MHz and the third frequency band ranges from 1559 MHz to 1610 MHz.

29. The portable communication device of claim 21, further comprising:
a first connection member connected with the first conductive member; and
a second connection member connected with the second conductive member,
wherein the wireless communication circuitry is capable of transmitting or receiving the first signal through the first connection member, and
wherein the GNSS receiver circuitry is capable of receiving the second signal through the first connection member and capable of receiving the third signal through the second connection member.

30. The portable communication device of claim 29, further comprising:
a GNSS tuner electrically connected with the first filter, the second filter, and the wireless communication circuitry,
wherein, when a frequency band of the first signal is changed, the wireless communication circuitry is configured to change at least one of capacitance and an inductance of the GNSS tuner.

* * * * *